United States Patent [19]

Hyson et al.

[11] 3,832,468

[45] Aug. 27, 1974

[54] USE OF CERTAIN SMECTITE CLAYS TO EXTEND RESIDUAL ACTIVITY OF PARTICULAR HYDROXAMATES

[75] Inventors: Archibald M. Hyson, Newark; John K. Scoggin, Wilmington, both of Del.

[73] Assignee: E. I. du Pont de Nemours and Company, Wilmington, Del.

[22] Filed: May 14, 1971

[21] Appl. No.: 143,682

Related U.S. Application Data

[63] Continuation-in-part of Ser. No. 45,229, June 10, 1970, abandoned.

[52] U.S. Cl. .................. 424/298, 424/300, 424/357

[51] Int. Cl. .......................... A01n 9/12, A01n 9/20

[58] Field of Search ...................... 424/300, 357, 298

[56] References Cited

UNITED STATES PATENTS

| | | | |
|---|---|---|---|
| 3,414,652 | 12/1968 | Buchanan | 424/218 |
| 3,576,834 | 4/1971 | Buchanan | 260/453 |

*Primary Examiner*—Vincent D. Turner

[57] ABSTRACT

Pesticidal formulations of methyl O-(methylcarbamyl)thiolacetohydroxamate and methyl O-carbamyl thiol-acetohydroxamate with adsorptive uncalcined smectite-containing clays having extended residual activity, and formulations of methyl O-(methylcarbamyl)thiolaceto-hydroxamate and adsorptive uncalcined smectite-containing clays having reduced phytotoxicity on pesticide-sensitive crops such as cotton, corn and other leafy vegetables.

8 Claims, No Drawings

USE OF CERTAIN SMECTITE CLAYS TO EXTEND RESIDUAL ACTIVITY OF PARTICULAR HYDROXAMATES

REFERENCE TO RELATED APPLICATIONS

This application is a continuation-in-part of my co-pending application Ser. No. 45,229, filed June 10, 1970, now abandoned.

BACKGROUND OF THE INVENTION

This invention relates to pesticidal formulations of methyl O-(methylcarbamyl)thiolacetohydroxamate and methyl O-carbamyl thiolacetohydroxamate with adsorptive uncalcined, smectite-containing clays, methods for the control of pests in cotton, corn and other pesticide-sensitive crops, methods for reducing the phytotoxicity of methyl O-(methylcarbamyl)-thiolacetohydroxamate, and methods for extending the residual activity of methyl O-(methylcarbamyl)thiolacetohydroxamate and methyl O-carbamyl thiolacetohydroxamate.

The type and number of pesticidal diluents known and available to art is almost infinite. For example, finely divided solid materials such as the natural silicates (talcs, sepiolites, pyrophyllites), the clays (montmorillonites, kaolinites, attapulgites, vermiculites, halloysites, illites, chlorites), diatomaceous earths, synthetic magnesium silicates, the synthetic silicas, calcium silicates, calcium sulfate, calcium carbonate, calcium phosphates, and the natural flours of walnut shell, redwood and cottonseed, are a few examples of the many materials which have been used as pesticidal diluents at one time or another.

U.S. Pat. No. 3,576,834 (Buchanan) that issued Apr. 27, 1971, discloses substituted O-carbamylhydroxamates as being highly effective insecticidal agents. Certain of these compounds tend to exhibit some degree of phytotoxicity where applied as a foliar spray or dust in certain crops or plants. This of course detracts from their overall usefulness for controlling insects on certain crops.

Methyl O-(methylcarbamyl)thiolacetohydroxamate and methyl O-carbamyl thiolacetohydroxamate are characterized by having a relatively brief period of residual activity when used to treat crops or fruit trees. The compounds are apparently bio-degraded to non-pesticidal products by the plants. This is a highly advantageous property in the treatment of crops to control insects shortly before harvest, but in other applications such as in the control of persistent pests on fruit trees and sugar cane, it would be desirable, if possible, to extend the residual activity of the compounds for a few additional days.

It has been found that the formulations of the present invention reduce the tendency of methyl O-(methyl carbamyl)thiolacetohydroxamate to be phytotoxic to plants and also extend the residual activity of the compound, as well as that of methyl O-carbamyl thiolacetohydroxamate, without adversely altering the pesticidal efficacy. This finding is particularly surprising inasmuch as conventional clay diluents do not provide these results. Furthermore, only the particular smectite clays meeting the criteria specified in the definition of the invention are desirable.

SUMMARY OF THE INVENTION

The pesticidal formulations of this invention in its broadest aspect is defined as a pulverulent pesticidal formulation having enhanced residual activity comprising an active ingredient selected from the group consisting of methyl O-(methylcarbamyl)thiolacetohydroxamate and methyl O-carbamyl thiolacetohydroxamate and an adsorptive uncalcined mineral smectite having a HAT adsorptive factor of at least 35 percent, the weight ratio of smectite to the active ingredient being at least three to four.

In the narrower aspect the invention is defined as above except that the active ingredient is methyl O-(methylcarbamyl)thiolacetohydroxamate and the formulation in addition to exhibiting enhanced residual activity of the active ingredient has a reduced phytotoxicity to plants.

It is preferred that the mineral smectite have a predominant changeable cation in its crystal lattice selected from the group of calcium or magnesium. It is preferred that the relative weight proportion of the smectite to the active ingredient is at least 20 to four. It is more preferable that in the above formulations the HAT adsorptivity factor (defined hereinafter) of the smectite is at least 40 percent. In one useful composition of this invention the active ingredient is present to the extent of up to 5 percent by weight based on the total weight of active ingredient and smectite.

A preferred wettable powder pesticidal formulation of this invention is defined as a water-dispersible wettable powder pesticidal formulation having enhanced residual activity comprising about five–55 parts of an active ingredient selected from the group consisting of methyl O-(methylcarbamyl)-thiolacetohydroxamate and methyl O-carbamyl thiolacetohydroxamate; about 35–95 parts of uncalcined mineral smectite having a HAT adsorptive factor of at least 35 percent and having a cation exchange capacity of 40 to 150 milliequivalents per 100 grams of mineral smectite and a 2:1 expanding crystal lattice; up to three parts surfactant; up to 15 parts dispersing agent; up to two parts corrosion inhibitor; and up to two parts conditioning agent. A preferred wettable powder is as defined above except that the active ingredient is methyl O-(methylcarbamyl)thiolacetyohydroxamate and the formulation in addition to having enhanced residual activity exhibits a reduction in the tendency to be phytotoxic to plants. The formulations can also be prepared as dust.

The method of this invention in its broadest aspects is defined as being in the method of controlling insect pests in the locus of plants which comprises applying a pesticidally effective amount of an active ingredient selected from the group consisting of methyl O-(methylcarbamyl)thiolacetohydroxamate and methyl O-carbamyl thiolacetohydroxamate to the foliage of said plants; the improvement for extending residual activity of the active ingredient which comprises incorporating an uncalcined mineral smectite as a diluent with the active ingredient, the smectite having a HAT adsorptivity factor of at least 35 percent and the smectite and the active ingredient are in the relative weight proportion of at least three to four.

The method of this invention in its narrower scope is as defined above, except that the active ingredient is limited to methyl O-(methylcarbamyl)thiolacetohydroxamate and the invention, in addition to extending the residual activity of the active ingredient, reduces the tendency of the active ingredient to be phytotoxic to plants.

The preferences desirable in the above description of the formulations of the invention are also applicable to the above defined methods of the invention. In addition it is preferred that the plants are cotton, the mineral smectites selected from the group of clays consisting of Red Panther Creek Southern bentonites, Blue Panther Creek Southern bentonite, Volclay bentonite, and montmorillonites of South Dakota, and the pests are preferably selected from the group consisting of boll weevils, bollworms, and armyworms.

DESCRIPTION OF THE INVENTION

Formulations of this invention suitable for foliar pesticidal use must contain a pesticidally effective amount of methyl O-(methylcarbamyl)thiolacetohydroxamate or methyl O-carbamyl thiolacetohydroxamate and adsorptive uncalcined smectite-containing clay diluent, and can optionally contain minor amounts (less than 50 percent based on the weight of essential clay) of inert diluents, wetting agents, dispersing agents, corrosion inhibitors and/or conditioning agents. The smectite must meet the requirements for adsorptivity as manifest by the Hyson Absorptivity Test (HAT) described hereinafter.

Pesticidal Compound

The active pesticidal compounds of this invention are methyl O-(methylcarbamyl)thiolacetohydroxamate and methyl O-carbamyl thiolacetohydroxamate which can be represented by the formula:

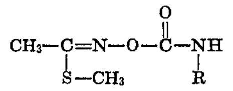

where R is hydrogen or methyl.

Methyl O-(methylcarbamyl)thiolacetohydroxamate and methyl O-carbamyl thiolacetohydroxamate can be prepared as described in U.S. Pat. No. 3,576,834 (Buchanan) that issued Apr. 27, 1971, by reacting the appropriate hydroxamate ester with sodium hydride in a suitable solvent such as tetrahydrofuran, adding to the resulting sodium salt, a solution of phosgene, and then reacting the chloroformate intermediate with two equivalents of methylamine or ammonia. The above series of reactions can be illustrated by the following equations:

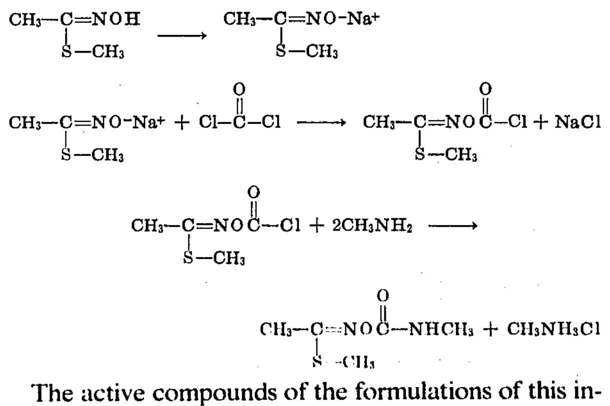

The active compounds of the formulations of this invention are highly effective pesticidal agents against such pests as the housefly, aphids, mites, the southern armyworm, the boll weevil and the bollworm.

Formulation Components

In order to obtain reduced phytotoxicity or improved residual activity, the compounds of this invention must be formulated with a specific type of clay diluent out of the many types which are available as diluents for insecticides. The active diluents are selected from a group of clays called smectites. The term smectite is defined by Grim ("Clay Mineralogy," McGraw-Hill, second Ed., 1968) as follows:

The name montmorillonite is used currently both as a group name for all clay minerals with an expanding lattice, except vermiculite, and also as a specific mineral name. Specifically it indicates a high-alumina end member of the montmorillonite group with some slight replacement of $Al^{3+}$ by $Mg^{++}$ and substantially no replacement of $Si^{4+}$ by $Al^{3+}$. MacEwan suggested the term montmorillonoid for the group name to avoid confusion with montmorillonite as a specific mineral name, and Correns suggested montmorin as the group name. Neither of these names has found favor. The name smectite suggested as a group name by the Clay Minerals Group of the Mineralogical Society of Great Britain (Brown) at the outset met strong opposition, particularly by many American mineralogists, but it is becoming widely accepted, and it will be used in this volume, with montmorillonite the species name as just defined.

Hence, smectites include those clays known as montmorillonites, many of which are also called bentonites.

The operable smectites of this invention may be described as follows:

They contain a 2:1 expanding crystal lattice (as described in greater detail below), are non-calcined and adsorb methyl O-(methylcarbamyl)thiolacetohydroxamate from aqueous solutions by a specific adsorption test. Smectite-containing clays must possess all three of the above properties to be operable in the invention. Many smectites do not possess all three of these properties and, hence, are not operable in this invention. Examples of smectites or smectite-containing clays which are operable in this invention are given below:

- "Panther Creek" Southern bentonite (both blue and red varieties)
- "Pelbon" Southern bentonites
- "Volclay" bentonite
- "Wyogel" bentonite
- "T.A.T." bentonite
- "Wyo-Bond" bentonite
- Hectorite No. 34 (Hector, Cal.)*
- Montmorillonite No. 21 (Polkville, Miss.)*
- Montmorillonite No. 27 (Belle Fourche, S.D.)*

*Described in American Petroleum Institute Clay Mineral Standards Project No. 49.

Non-calcined smectites may be readily identified by X-Ray diffraction measurements and also by determination of total surface area via glycol adsorption.

Definition of the term adsorptive is a very necessary part of this invention. By adsorptive uncalcined smectite-containing clay we mean clays of the designated type which adsorb 35 percent or more of methyl O-(methylcarbamyl)-thiolacetohydroxamate from aqueous solution under the exact condition described below.

Five grams of the uncalcined smectite-containing clay, 100 g. of water and 1.0 g. of methyl O-(methylcarbamyl)-thiolacetohydroxamate are placed in an 8 oz. bottle and shaken mechanically for 24 hours. The slurries are then filtered through a fine sintered glass filter to remove the clay. The water is allowed to evaporate from 50 ml. of the filtrate at room temperature and the residue extracted with acetate and filtered to remove any remaining trace of clay. The acetone is allowed to evaporate from the filtrate at room temperature until the crystalline residue reaches constant weight. The percent solids adsorbed are calculated as indicated below:

$$0.50 \text{ g.} - \text{grams of residue from acetone extraction}/0.50 \text{ g.} \times 100 = \text{percent adsorbed}$$

Identical results can be obtained by analyzing the aqueous filtrate (after removal of clay) for methyl O-(methylcarbamyl)thiolacetohydroxamate by the isotope tracer technique through the use of $C^{14}$ tagged insecticide. In this case the percentage of methyl O-(methylcarbamyl)-thiolacetohydroxamate present in the aqueous filtrate is compared with that originally present in the water.

The data given in Table I show the relation between the adsorptivity of clays and the reduction of phytotoxicity to cotton obtained by spraying the cotton with aqueous slurries of clay and methyl O-(methylcarbamyl)thiolacetohydroxamate at 0.95 percent and 0.05 percent concentrations respectively in the spray slurries.

sheet $[Al_2(O_2OH)_2]$. Each adsorptive uncalcined clay diluent of the formulations of this invention is made up of a plurality of such laminates separated from each other by an aqueous cationic fluid interphase of varying thickness. The thickness of this aqueous cationic interphase will vary from clay to clay, and even within the same clay, depending upon the amount of water present in the lattice.

Apparently, the crystal lattice of smectite is highly plastic, capable of expansion and contraction in accommodation of the variable water content of such mineral. Extensive heating of smectite-containing clays at elevated temperatures (600°–800°C.) will effectively remove both the adsorbed and combined water of the mineral's crystal lattice and destroy the plastic character of the clay. These calcined smectite-containing clays are not suitable for the formulations of this invention although they are satisfactory diluents in conventional insecticidal formulations.

The mineral smectite is also characterized by the capacity of the aqueous cationic interphase of the mineral's crystal lattice to readily exchange its native cations for other cations. This property, known as cation exchange capacity, can vary over a broad range within each class of mineral, and from one class of mineral to another, and has been determined in smectite to range from about 50 to 150 milliequivalents per 100 grams mineral, (calculated by the method described by Table I Adsorption of Methyl O-(methylcarbamyl)thiolacetohydroxamate on Clays vs. Reduction in Phytotoxicity to Cotton

| Clay* and Where Mined | % Insecticide Adsorbed | Typical % Reduction in Phytotoxicity |
|---|---|---|
| Blue "Panther Creek" Southern Bentonite (Miss.) | 54 | 75 |
| "Volclay" Bentonite (Wyoming and South Dakota) | 54 | 91 |
| Montmorillonite No. 27 (South Dakota) | 52 | 92 |
| Montmorillonite No. 23 (Arizona) | 24 | 32 |
| Montmorillonite No. 24 (California) | 14 | 8 |
| "Volclay" Bentonite (calcined at 800°C.) | 4 | 0 |

*All clays screened through 200 mesh. The above montmorillo-nites were obtained from Ward's Natural Science Establishment, Inc., Rochester, N.Y. and have been characterized in American Petroleum Institute Research Project No. 49. Blue "Panther Creek" Southern Bentonite and "Volclay" Bentonite are commercial products.

From the above it can be seen that not all smectites adsorb methyl O-(methylcarbamyl)thiolacetohydroxamate. The non-adsorptive smectites are not effective biologically in reducing phytotoxicity and hence are excluded from this invention. Only those smectite-containing clays adsorbing 35 percent or more of methyl O-(methylcarbamyl)thiolacetohydroxamate are considered to be adsorptive for purposes of this invention.

In addition, the ratio of the mineral smectite to insecticide is critical. The adsorptive uncalcined clay diluent component of the formulations of this invention must contain at least 20 percent of the mineral smectite. In the preferred embodiments of the invention the uncalcined clay will contain at least 60, and most preferably, at least 75 weight percent of such mineral.

Smectite is ordinarily characterized by its 2:1 expanding crystal lattice in which two sheets of silicate are condensed in sandwich fashion, on a single gibbsite Peech, Soil Sci. 59, 25–38, 1945). Smectites can also be characterized by their lattice spacing which normally ranges from about 9 to about 22 A units or may even reach 30 A depending on the degree of hydration.

The exchangeable cations in the aqueous cationic interphase of the smectite mineral crystal comprises predominantly sodium, potassium, lithium, calcium or magnesium ions. Even though only one species of cation will usually dominate in each type of clay, other exchangeable cations can also be present in minor amounts.

The naturally occurring adsorptive uncalcined clays of the formulations of this invention, such as the adsorptive uncalcined montmorillonites or bentonites can be modified by having their native cations replaced with other cationic compounds or ions. For example, the native calcium cations of many of the uncalcined montmorillonite clays mined in the southern areas of the United States can be replaced with zinc cations by washing the clay with a solution of zinc acetate. Modification of the naturally occurring adsorptive uncalcined montmorillonite clays in this manner does not adversely affect their activity with respect to the formulations of this invention.

Some of the adsorptive clays of this invention are generally described as "bentonitic," that is, capable of expanding their lattice structure upon the adsorption of water. These are preferred clays. A number of these adsorptive uncalcined bentonitic type clays are mined in the western and northern states of the United States and have sodium as their exchangeable ion, and specifically include "Volclay" from the Black Hills region of Wyoming and South Dakota, other Black Hills bentonites, "Wyo-Gel" bentonites, "T.A.T." bentonite, and "Wyo-Bond" bentonites.

The most preferred bentonitic type clays of this invention are the adsorptive uncalcined montmorillonite clays having naturally occurring divalent cations, such as calcium and magnesium, interleaved between the silicate-gibbsite laminates of their active mineral crystal lattice.

Representative of the most preferred class of bentonitic type clays of this invention are those which are mined in the southern states of the United States and include the blue and red "Panther Creek" clays, and the "Pelbon" clays of Monroe and Itawamba Counties, Miss.

The formulations of this invention can contain, in addition to adsorptive uncalcined smectite-containing clay, a minor amount of other diluents. Materials, such as the natural silicates (e.g., talc, sepiolite, pyrophyllite); calcined montmorillonites, kaolinite, attapulgite, vermiculite; diatomaceous earth; synthetic magnesium silicate; synthetic silicas; calcium silicate, calcium sulfate, calcium carbonate; calcium phosphate; walnut shell flour, etc. can be present in these formulations in minor amounts.

Surface active agents, or surfactants, which can also be used in the formulations of this invention function as wetting, dispersing and emulsifying agents to assist in the dispersion of the active pesticidal compound in a spray. These surfactants can act as spreaders which aid in obtaining uniform coverage of the surfaces to be protected. Surfactants of the formulations of this invention can include such anionic, non-ionic and cationic agents as have been traditionally used in pesticidal formulations. A detailed list of such agents may be found in "Detergents and Emulsifiers, 1970 Annual," by John W. McCutcheon, Inc.

Of the conventional surfactants used in such formulation, those generally described as anionic and non-ionic are preferred. Among the preferred anionic surfactants are the alkali and alkaline earth salts of alkylarylsulfonic acid, e.g., dodecylbenzenesulfonates and alkylnaphthalenesulfonates; oil-soluble petroleum sulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isethionate.

Among the conventional non-ionic surfactants, ethylene oxide condensates with alkylated phenols, sorbitan fatty esters, long chain alcohols or mercaptans, and with fatty acids are preferred.

Alkali and alkaline earth salts of lignosulfonic acid, salts of polymerized alkylarylsulfonates, methylcellulose and polyvinyl alcohol are preferred as the dispersants for the formulations of this invention.

Other materials, such as conventional conditioning agents and corrosion inhibitors, can also be added to these formulations in minor amounts.

In general, the formulations of this invention can be prepared in the form of dusts, wettable powders, or slurries and applied as dusts or sprays to the foliage of the vegetation to be protected. Either method of application will extend residual activity and under some conditions reduce phytotoxicity.

Formulation Preparation

The proportion of uncalcined clay to pesticide will vary with the smectite content of the specific clay diluent. For example, it will take approximately three parts 20 percent smectite-containing clay to have the same effect as 1 part 60 percent smectite-containing clay in the formulations of this invention.

In all the pesticidal formulations that are subsequently disclosed where the proportion of adsorptive uncalcined smectite-containing clay to pesticide is specified, it shall be understood that such uncalcined clay has a smectite concentration of at least 75 weight percent unless otherwise stipulated.

Pesticidal formulations of this invention having extended residual activity can be prepared by mixing methyl O-(methylcarbamyl)thiolacetohydroxamate or methyl O-carbamyl thiolacetohydroxamate with an adsorptive uncalcined smectite-containing clay in such proportions that the ratio of smectite to insecticide active ingredient is at least 3:4.

Pesticidal formulations of this invention having both extended residual activity and reduced phytotoxicity can be prepared by mixing methyl O-(methylcarbamyl)thiolacetohydroxamate with a clay containing adsorptive, uncalcined smectite in such proportions that the ratio of smectite to methyl O-(methylcarbamyl)thiolacetohydroxamate is preferably at least 20:4.

All the formulations of this invention can be prepared by conventional techniques and equipment. For example, dusts and wettable powder can be prepared by mixing the active insecticide and adsorptive, uncalcined, smectite-containing clay, along with optional additives, followed by simple blending and, if desired, hammer-milling. It is also possible to impregnate the smectite-containing clay with a solution of the insecticides, followed by solvent removal.

A typical water-dispersible wettable powder formulation of this invention can contain about three to 55 parts pesticide, 45 to 97 parts adsorptive uncalcined smectite-containing clay, zero to three parts wetting agent, zero to 15 parts dispersing agent, zero to two parts corrosion inhibitor, and zero to two parts conditioning agent.

A preferred water-dispersible wettable powder formulation of this invention should contain about 10 to 50 parts pesticide, 50 to 90 parts adsorptive uncalcined smectite-containing clay, having exchangeable cations of calcium or magnesium interleaved in the minerals' crystal lattice, zero to two parts wetting agent, zero to two parts dispersant and zero to three parts conditioning agent.

The most preferred water-dispersible wettable powder formulations of this invention should contain about 15 to 40 parts pesticide, 60 to 85 parts blue or red "Panther Creek" clay, zero to two parts wetting agent, zero to two parts dispersant and zero to three parts conditioning agent.

A typical dust formulation of this invention can comprise 0.5 to 35 parts insecticide, 65 to 99.5 parts adsorptive uncalcined smectite-containing clay and three parts or less of surfactants, dispersants, conditioning agents and corrosion inhibitor.

A preferred dust formulation of this invention should contain about one to 15 parts pesticide and 85 to 99 parts adsorptive uncalcined smectite-containing clay, having exchangeable cations of calcium or magnesium interleaved in the mineral lattice, and optionally contain minor amounts of other conventional additives in lieu of equivalent amounts of clay.

The most preferred dust formulations of this invention should contain about two to five parts insecticide and 98 to 95 parts blue or red "Panther Creek" clay and optionally contain minor amounts of other conventional additives in lieu of equivalent amounts of clay.

It is an additional advantage of the formulations of methyl O-(methylcarbamyl)thiolacetohydroxamate with adsorptive, uncalcined smectite-containing clays, that the mineral smectite does not catalyze, promote or accelerate the chemical decomposition of the insecticide during storage.

Efficacy

The pesticidal formulations of this invention have either extended residual activity or extended residual activity coupled with reduced phytotoxicity on pesticide-sensitive crops depending upon the ratio of pesticide to clay in the specific formulation.

The mechanism by which methyl O-(methylcarbamyl)-thiolacetohydroxamate or methyl O-carbamyl thiolacetohydroxamate and adsorptive uncalcined smectite-containing clays cooperate to produce formulations having these surprising advantages is not fully known.

These formulations, because of their extended residual activity, are especially effective for foliar application in order to control persistent pests which infest fruiting trees and sugar cane. By extending the normal residual activity of the pesticide from a maximum period of 5 days to 10 to 12 days, methyl O-(methylcarbamyl)-thiolacetohydroxamate and methyl O-carbamyl thiolacetohydroxamate can be used at lower rates of application and applied less frequently and still afford comparable pest control protection. The extension of the period of residual activity makes the use of such formulations more consistent with the normal spraying cycles presently in use for the control of pests in fruiting trees.

Some of the specific formulations of this invention have both reduced phytotoxicity on pesticide-sensitive crops such as cotton and corn and extended residual activity. Ordinarily, pesticide-sensitive vegetation will manifest pesticide injury on the foliar portions of the plant, and the extent of such expression of injury will vary with the time of year, the temperature of the environment, and the stage of growth or maturity of the plant. However, when methyl O-(methylcarbamyl)thiolacetohydroxamate, ordinarily toxic to cotton and corn, is formulated with an adsorptive uncalcined smectite-containing clay, little if any injury occurs even during the plants most vulnerable period of growth or under the most unfavorable temperature conditions.

The examples which follow provide a number of specific embodiments of the disclosure of this invention.

Parts and percentages, where used in such examples, are by weight unless otherwise stipulated.

The HAT adsorptivity of the uncalcined adsorptive smectite clays of the Examples are as follows: Blue "Panther Creek" Southern bentonite (54 percent), Red "Panther Creek" Southern bentonite (42 percent), "Volclay" (54 percent), and "Wyo-Gel" (56 percent).

Any smectite listed as adsorptive has a HAT of at least 35 percent.

The following examples illustrate the invention:

Example 1

| | |
|---|---|
| Red "Panther Creek" Southern bentonite clay | 98.0% |
| Methyl O-(methylcarbamyl)thiolacetohydroxamate | 2.0% |

The above ingredients are blended, hammer-milled through a coarse screen and reblended to produce a non-phytotoxic dust. "Volclay" bentonite and "Wyogel" bentonite can be substituted for Red "Panther Creek" Southern bentonite in the above example.

This formulation is applied by means of a tractor-mounted duster at a rate of 11 to 22 kilograms of dust per hectare of cotton. Applications are made on a weekly schedule and finally on a 5 day schedule during the latter part of the growing season. The treated cotton is protected from attacks of the boll weevil (*Anthonomous grandis*) and the bollworm complex including *Heliothis zea* and *Heliothis virescens*. The developing squares and bolls are retained by the plants and a good yield of cotton fiber is obtained at the end of the season.

These rates of application as well as even higher rates are used with complete safety to the cotton plants.

Example 2

| | |
|---|---|
| Blue "Panther Creek" Southern bentonite | 47.5% |
| Methyl O-(methylcarbamyl)thiolacetohydroxamate | 52.5% |

The above ingredients are blended, hammer-milled and reblended to form a dust concentrate. This concentrate is blended with additional blue "Panther Creek" Southern bentonite to give dusts having an active content of 3 and 5 percent, respectively. These dusts are slurried in water at 0.05 percent active with Duponol 1:3000 and sprayed on Stoneville 213 cotton to run-off along with an untreated control and one containing only methyl O-(methylcarbamyl)thiolacetohydroxamate in water. After 7 days the average (three replications) phytotoxicity rating is recorded. The results are given in Table II.

Table II

| %Methyl O-(methylcarbamyl)-thiolacetohydroxamate % Active in Composition | % Active in Spray | Average Phytotoxicity Rating after 7 Days* |
|---|---|---|
| 100 (control) | 0.05 | 2.3 |
| 3 | 0.05 | Slight Trace |
| 5 | 0.05 | 0.2 |
| Untreated Control | — | None |

*Rating system based on 0 = no injury; to 10 = plant killed.

Portions of the above 3 percent composition are stored at 0° and 45°C. for a period of 2 months. Chemical analyses indicate that no decomposition has occurred in either sample. Additional phytotoxicity tests with cotton show that no increase in phytotoxicity occurs on storage at either temperature.

Spray tests are also run to determine the initial armyworm activity of the 3 percent composition compared to recrystallized methyl O-(methylcarbamyl)thiolacetohydroxamate.

These results are given in Table III.

| Test Composition | % Active in Spray | Insecticidal Activity % Dead* |
|---|---|---|
| 100% Recrystallized active | 0.01 | 83 |
| | 0.005 | 50 |
| | 0.0025 | 58 |
| 3% Active on Blue "Panther Creek" clay (0°C. - 2 months) | 0.01 | 100 |
| | 0.005 | 80 |
| | 0.0025 | 63 |
| 3% Active on Blue "Panther Creek" clay (45°C. - 2 months) | 0.01 | 100 |
| | 0.005 | 85 |
| | 0.0025 | 68 |
| Untreated | — | 0 |

*Average of at least 3 replicates.

Method: Red kidney bean plants are sprayed to run-off with aqueous dispersions of the test materials containing a wetting agent. As soon as the plants are dry, a 5 cm. diameter leaf disc is cut from each leaf and placed in a 10 cm. Petri dish containing 10 larvae (about 11 mm. long) of the southern armyworm (*Prodenia eridania*). Readings are made 24 hours later.

The residual armyworm activity is determined for the 3 percent active composition. The composition is slurried in water, a wetting agent added and the suspension is sprayed on red kidney bean plants to run-off. Plants are placed under lights in a constant temperature room at 25°C. At intervals, 5 cm. diameter leaf discs are cut from the leaves and exposed to *Prodenia eridania* larvae. The results are summarized in Table IV.

Table IV

| Days After Spraying | % Active in Spray | Methyl O-(methylcarbamyl)-thiolacetohydroxamate: 100% Active (Recryst.) % Dead | 3% Composition % Dead |
|---|---|---|---|
| 1 | 0.04 | — | — |
| | 0.02 | 90 | 100 |
| | 0.01 | 70 | 95 |
| 2 | 0.04 | 83 | 100 |
| | 0.02 | 47 | 93 |
| | 0.01 | 40 | 97 |
| 7 | 0.04 | 60 | 100 |
| | 0.02 | 37 | 100 |
| | 0.01 | 0 | 100 |
| 9 | 0.04 | 70 | 98 |
| | 0.02 | 37 | 98 |
| Untreated | — | 0% kill | 100% feeding |

Example 3-*a*

| | |
|---|---|
| Methyl O-(methylcarbamyl)thiolacetohydroxamate | 2.0% |
| Attapulgite ("Attaclay" — HAT factor 19%) | 98.0% |

The above composition is blended, hammer-milled through a fine screen and reblended to give a 2 percent dust based on a conventional diluent.

Example 3-*b*

| | |
|---|---|
| Methyl O-(methylcarbamyl)thiolacetohydroxamate | 2.0% |
| Blue "Panther Creek" Southern bentonite | 98.0% |

The above composition is blended, hammer-milled through a fine screen and reblended to produce a 2 percent dust.

Example 3-*c*

| | |
|---|---|
| Methyl O-(methylcarbamyl)thiolacetohydroxamate | 25.0% |
| Blue "Panther Creek" Southern bentonite | 75.0% |

The above composition is blended, hammer-milled through a fine screen and reblended to produce a 25 percent dust concentrate. This concentrate is blended with additional Blue "Panther Creek" Southern bentonite to give a 2 percent dust.

The 2 percent active compositions of Examples 3-*a*, 3-*b* and 3-*c* above are tested as dusts for residual activity and for phytotoxicity to cotton. Procedure:

A 12.5 cm. diameter pot containing two cotton plants (about three true leaves) of the Stoneville 213 variety is placed under a 25 cm. diameter Bell jar. The weighed amount of dust is placed in a small weighing pan and suspended about 4 cm. over the plants. A vacuum of 10 cm. is drawn on the closed system and then released to form a cloud of dust in the Bell jar. After settling, the plants are removed and placed in a greenhouse to permit the possible development of injury.

At 7 days after treatment, a dusted leaf is excised and placed in a Petri dish with 10 larvae (about 11 mm. long) of the southern Armyworm (*Prodenia eridania*).

The results of these tests are given in Tables V and VI, respectively.

Table V

| Composition | Residual Activity - 7 Days: mg. Active for Bell Jar | Residual Activity % Dead |
|---|---|---|
| 2% dust from Ex. 3-*a* | 3.0 | 40 |
| 2% dust from Ex. 3-*b* | 3.0 | 100 |
| 2% dust from Ex. 3-*c* | 3.0 | 97 |
| Untreated | — | 0 |

Table VI

| Phytotoxicity to Cotton (Stoneville 213) Composition | mg. Active for Bell Jar | Injury Rating* 7 Days |
|---|---|---|
| 2% dust from Ex. 3-*a* | 12 | 0.5 |
| | 6 | 0.5 |
| | 3 | 0.2 |
| 2% dust from Ex. 3-*c* | 12 | 0 |
| | 6 | 0 |
| | 3 | 0 |
| 2% dust from Ex. 3-*c* | 12 | 0 |
| | 6 | 0 |
| | 3 | 0 |
| Untreated | — | 0 |

*In duplicate rating system, 0 = no injury; to 10 = plant killed.

Example 4-*a*

| | |
|---|---|
| Methyl O-(methylcarbamyl)thiolacetohydroxamate | 25.0% |
| Attapulgite ("Attaclay" — HAT factor 19%) | 75.0% |

The above composition is blended, hammer-milled through a coarse screen and reblended to form a composition which can be dispersed in water.

Example 4-*b*

| | |
|---|---|
| Methyl O-(methylcarbamyl)thiolacetohydroxamate | 25.0% |
| Blue "Panther Creek" Southern bentonite | 75.0% |

The above composition is blended, hammer-milled through a coarse screen and reblended to form a composition which can be dispersed in water.

The residual armyworm activity of the above compositions is determined by spraying red kidney bean plants with aqueous slurries and exposing leaf discs at intervals to southern armyworm (*Prodenia eridania*) larvae.

The results are shown in Table VII.

Table VII

Residual Activity*

| Composition | % Active in Spray | Interval after Spraying: 2 Days % Dead | 7 Days % Dead | 9 Days % Dead |
|---|---|---|---|---|
| 100% Active | 0.04 | 65 | 65 | 55 |
| | 0.02 | 35 | 30 | 27 |
| | 0.01 | 0 | 0 | 0 |
| Composition of Ex. 4-*a* | 0.04 | 80 | 85 | 67 |
| | 0.02 | 10 | 15 | 20 |
| | 0.01 | 5 | 0 | 0 |
| Composition of Ex. 4-*b* | 0.04 | 90 | 95 | 100 |
| | 0.02 | 85 | 85 | 98 |
| | 0.01 | 35 | 35 | 50 |
| Untreated | — | 0 | 0 | 0 |

*Duponol 1:3000 added to all sprays as a wetting agent. Results are the average of 2-4 replicates.

Example 5-*a*

| | |
|---|---|
| Methyl O-(methylcarbamyl)thiolacetohydroxamate | 20.0% |
| Attapulgite ("Attaclay" — HAT factor 19%) | 80.0% |

The above ingredients are blended, hammer-milled through a coarse screen and reblended to form a composition which can be dispersed in water.

Example 5-*b*

| | |
|---|---|
| Methyl O-(methylcarbamyl)thiolacetohydroxamate | 30.0% |
| Blue "Panther Creek" Southern bentonite | 70.0% |

The above ingredients are blended, hammer-milled through a coarse screen and reblended to form a composition which can be dispersed in water.

Example 5-*c*

| | |
|---|---|
| Methyl O-(methylcarbamyl)thiolacetohydroxamate | 50.0% |
| Blue "Panther Creek" Southern bentonite | 50.0% |

The above ingredients are blended, hammer-milled through a coarse screen and reblended to form a composition which can be dispersed in water.

The compositions of Examples 5-*a*, 5-*b* and 5-*c* are tested for residual activity. The results are given in Table VIII.

Table VIII

| Composition | % Active in Spray | Interval after Spraying: 2 Days % Dead | 7 Days % Dead | 9 Days % Dead |
|---|---|---|---|---|
| Composition of Ex. 5-*a* | 0.04 | 90 | 85 | 77 |
| | 0.02 | 90 | 57 | 43 |
| | 0.01 | 57 | 0 | 0 |
| Composition of Ex. 5-*b* | 0.04 | 100 | 100 | 98 |
| | 0.02 | 90 | 100 | 95 |
| | 0.01 | 90 | 77 | 67 |
| Composition of Ex. 5-*c* | 0.04 | 95 | 95 | 85 |
| | 0.02 | 80 | 90 | 67 |
| | 0.01 | 53 | 43 | 25 |
| Untreated | — | 0 | 0 | 0 |

Example 6-*a*

| | |
|---|---|
| Methyl O-(methylcarbamyl)thiolacetohydroxamate | 10.0% |
| Blue "Panther Creek" Southern bentonite | 88.5% |
| Sodium lignin sulfonate | 1.0% |
| Sodium alkyl naphthalene sulfonate | 0.5% |

The above ingredients are blended, hammer-milled through a fine screen and reblended to give a wettable powder which can be dispersed in water.

Example 6-*b*

| | |
|---|---|
| Methyl O-(methylcarbamyl)thiolacetohydroxamate | 20.0% |
| Blue "Panther Creek" Southern bentonite | 78.5% |
| Sodium lignin sulfonate | 1.0% |
| Sodium alkyl naphthalene sulfonate | 0.5% |

The above ingredients are blended, hammer-milled through a fine screen and reblended to give a wettable powder which can be dispersed in water.

Residual armyworm tests are run on the compositions of Examples 6-*a* and 6-*b* along with a 100 percent active control. Results are given in Table IX.

Table IX

| Composition | % Active in Spray | Interval after Spraying: 2 Days % Dead | 7 Days % Dead | 9 Days % Dead |
|---|---|---|---|---|
| 100 % Active | 0.04 | 95 | 80 | 70 |
| | 0.02 | 45 | 33 | 17 |

Table IX-Continued

| Composition | % Active in Spray | Interval after Spraying 2 Days % Dead | 7 Days % Dead | 9 Days % Dead |
|---|---|---|---|---|
| | 0.01 | 20 | 0 | 0 |
| Composition of Ex. 6-*a* | 0.04 | 100 | 100 | 95 |
| | 0.02 | 90 | 100 | 97 |
| | 0.01 | 95 | 80 | 95 |
| Composition of Ex. 6-*b* | 0.04 | 95 | 100 | 98 |
| | 0.02 | 100 | 97 | 100 |
| | 0.01 | 80 | 93 | 77 |
| Untreated | — | 0 | 0 | 0 |

Figures are the average of 2-4 replicates.

Example 7

| | |
|---|---|
| Methyl O-(methylcarbamyl)thiolacetohydroxamate | 5.0% |
| Blue "Panther Creek" Southern bentonite | 95.0 |

The above composition is prepared by simple blending of the ingredients. The following clays, which do not contain the mineral smectite, are used in place of the blue "Panther Creek" Southern bentonite: Mica-Ser-X and attapulgite-"Diluex" A.

The above compositions are tested for phytotoxicity on Stoneville 213 cotton with the results shown in Table X.

Table X

| Clay in Composition | % Active in Spray | % of Conc. Clay in Spray | Injury Rating after 6 Days* |
|---|---|---|---|
| None (100% control) | 0.05 | — | 2.0 |
| Blue "Panther Creek" Southern bentonite | 0.05 | 0.95 | 0.2 |
| Mica ("Ser-X" — HAT <35%) | 0.05 | 0.95 | 2.0 |
| Attapulgite ("Diluex" A — HAT <35%) | 0.05 | 0.95 | 2.0 |

*Rating system, 0 = no injury; to 10 = plant killed.

In a similar test, 5 percent dusts of methyl O-(methylcarbamyl)thiolacetohydroxamate in kaolinites ("Seminole" clay and "Bancroft" clay), diatomite ("Celite" 805) and pyrophyllite ("Pyrax" ABB) were injurious to cotton while the 5 percent dust in Southern bentonite (Blue "Panther Creek" clay) was non-injurious. The HAT factor for the above is less than 35 percent except for the Blue "Panther Creek" clay that is 54 percent.

Example 8

| | |
|---|---|
| Methyl O-(methylcarbamyl)thiolacetohydroxamate | 0.05% |
| Blue "Panther Creek" Southern bentonite | 0.95% |
| Water | 99.0% |

The above slurries are prepared by predispersing the following clays in water in a blender followed by addition of the active component. The following clays are used to replace the Blue "Panther Creek" Southern bentonite in the above example:

Bentonites — (HAT>35 percent) — "Volclay" bentonite, "Green Bond" bentonite, "Wyo-Gel" bentonite, "Akwaseal", "T.A.T." bentonite and red "Panther Creek" Southern bentonite, and Synthetic silica — "Santocel" C —(HAT <35 percent)

Kaolinite — "Velvex" clay — HAT<35 percent

The above slurries are tested for phytotoxicity to Stoneville 213 cotton. The results are given in Table XI.

Table XI

| Clay in Slurry | Cotton Injury Rating — 7 Days* |
|---|---|
| None (control — 0.05% active) | 2.25 |
| "Santocel" C | 2.0 |
| "Velvex" kaolinite clay | 2.0 |
| "Green Bond" bentonite | 0.4 |
| "Volclay" bentonite | trace |
| "Pelbon" Southern bentonite | 0.35 |
| "T.A.T." bentonite | 0.3 |
| "Akwaseal" | 0.35 |
| Blue "Panther Creek" Southern bentonite | 0.3 |
| Red "Panther Creek" Southern bentonite | 0.2 |
| Untreated | 0 |

*Rating system, 0 = no injury; to 10 = plant killed.

Example 9

| | |
|---|---|
| Methyl O-(methylcarbamyl)thiolacetohydroxamate | 5.0% |
| Synthetic bentonite* ($Zn^{++}$ replaceable ion — HAT >35%) | 95.0% |

*Prepared by washing Blue "Panther Creek" Southern bentonite with soluble salts of the cations listed.

The above components are tank-mixed at 0.05 percent active and 0.95 percent synthetic bentonite. $H^+$, $Mg^{++}$, $Li^+$, $Ba^{++}$, $Ca^{++}$ and $Al^{+++}$ can replace $Zn^{++}$ as the replaceable cation.* The HAT factor remains above 35 percent.

The slurries are sprayed on Stoneville 213 cotton to run-off and the phytotoxicity determined after 6 days. The results are given in Table XII.

*Prepared by washing Blue "Panther Creek" Southern bentonite with soluble salts of the cations listed.

Table XII

| Replaceable Cation | Injury Rating 6 Days* |
|---|---|
| No clay (control — 0.05% active) | 1.75 |
| $Ca^{++}$ (natural sub-bentonite clay) | 0.2 |
| $H^+$ | 0.2 |
| $Mg^{++}$ | 0.35 |
| $Li^+$ | 0.6 |
| $Ba^{++}$ | 0.2 |
| $Zn^{++}$ | Trace |
| $Al^{+++}$ | 0.15 |

*Rating system, 0 = no injury; to 10 = plant killed.

Example 10

Methyl O-carbamyl thiolacetohydroxamate is substituted for the methyl O-(methylcarbamyl)thiolacetohydroxamate in Examples 4-*a* and 4-*b* and the residual armyworm activity determined in the same manner with the following results.

Residual Activity of Methyl O-carbamyl thiolacetohydroxamate

| Time | % Active in Spray | Blue "Panther Creek" Clay % Dead | Blue "Panther Creek" Clay % Feeding | "Attaclay" (HAT-19%) % Dead | "Attaclay" (HAT-19%) % Feeding |
|---|---|---|---|---|---|
| 6 Days | 0.03 | 87 | 9 | 10 | 90 |
| | 0.015 | 40 | 40 | 0 | 100 |
| 8 Days | 0.03 | 90 | 8 | 0 | 100 |
| | 0.015 | 25 | 84 | 0 | 100 |

Example 11

| | |
|---|---|
| Methyl O-(methylcarbamyl)thiolacetohydroxamate | 1.0% |
| Montomorillonite No. 24 — (HAT factor 14%) | 19.0% |
| Water | 80.0% |

The above composition is mechanically shaken for approximately 16 hrs. and then diluted with additional water to a concentration of 0.05 percent active and 0.95 percent clay. The diluted composition is sprayed on Stoneville 213 cotton as described in Example 8. After 7 days the phytotoxicity is rated at 1.75B which is the same as that obtained from the control (active compound with no clay). Hence, no safening action is obtained.

In a parallel test, blue "Panther Creek" Southern bentonite (HAT 54 percent) at the same concentration as Montmorillonite No. 24, gave a phytotoxicity reading of 0.2B which corresponds to an 89 percent reduction in phytotoxicity.

I claim:

1. A pulverulent insecticidal composition having enhanced residual activity consisting essentially of 1. an insecticidally effective amount of an active ingredient selected from the group consisting of methyl O-(methylcarbamyl)-thiolacetohydroxamate and methyl O-carbamyl thiolacetohydroxamate and
2. an adsorptive uncalcined clay having a HAT adsorptivity factor of at least 35 percent and containing at least 20 percent by weight of a smectite having a 2:1 expanding crystal lattice, a cation exchange capacity in the range of about 50–150 milliequivalents per 100 grams and a lattice spacing in the range of about 9–30A, the weight ratio of smectite to active ingredient in the composition being at least 3:4.

2. The composition of claim 1 wherein said uncalcined clay has a HAT adsorptivity factor of at least 40 percent and contains at least 75 percent by weight of said smectite.

3. The composition of claim 2 having reduced phytotoxicity wherein (a) the active ingredient is methyl O-(methylcarbamyl) thiolacetohydroxamate and (b) the weight ratio of smectite to active ingredient is at least 20:4.

4. The composition of claim 2 which is a water-dispersible wettable powder containing about 10–50 parts of said active ingredient and about 50–90 parts of said adsorptive uncalcined smectite-containing clay, said clay having a predominance of exchangeable cations selected from the group consisting of calcium and magnesium cations interleaved in its crystal lattice.

5. The composition of claim 2 which is a dust containing about one–15 parts of said active ingredient and about 85–99 parts of said adsorptive uncalcined smectite-containing clay, said clay having a predominance of exchangeable cations selected from the group consisting of calcium and magnesium cations interleaved in its crystal lattice.

6. A method of controlling insects in the locus of plants which comprises applying thereto an insecticidally effective amount of the composition of claim 1.

7. A method of controlling insects in the locus of plants which comprises applying thereto an insecticidally effective amount of the composition of claim 3.

8. The method of claim 7 wherein the plants are cotton.

* * * * *